United States Patent [19]

Iwata

[11] Patent Number: 5,257,551
[45] Date of Patent: Nov. 2, 1993

[54] SHIFT LEVER LOCKING DEVICE FOR AUTOMATIC TRANSMISSION

[75] Inventor: Hajime Iwata, Aichi, Japan

[73] Assignee: Kabushiki Kaisha Tokai-Rika-Denki-Seisakusho, Aichi, Japan

[21] Appl. No.: 909,767

[22] Filed: Jul. 7, 1992

[30] Foreign Application Priority Data

Jul. 12, 1991 [JP] Japan .................. 3-172408

[51] Int. Cl.⁵ .................. B60K 20/02; G05G 9/00; G05G 5/06
[52] U.S. Cl. .................. 74/475; 74/538; 74/878; 192/4 A
[58] Field of Search .................. 74/475, 538, 878; 192/4 A

[56] References Cited

U.S. PATENT DOCUMENTS

| | | | |
|---|---|---|---|
| 4,880,092 | 11/1989 | Kito et al. | 74/475 X |
| 4,909,096 | 3/1990 | Kobayashi | 74/538 |
| 4,947,967 | 8/1990 | Kito et al. | 192/4 A |
| 5,003,799 | 4/1991 | Imai et al. | 74/878 X |
| 5,018,610 | 5/1991 | Rolinski et al. | 192/4 A |
| 5,025,901 | 6/1991 | Kito et al. | 192/4 A |
| 5,036,962 | 8/1991 | Amagasa | 192/4 A |
| 5,080,208 | 1/1992 | Sakuma et al. | 74/475 X |
| 5,127,245 | 7/1992 | Imai et al. | 74/878 X |
| 5,129,494 | 7/1992 | Rolinski et al. | 74/878 X |
| 5,150,593 | 9/1992 | Kobayashi et al. | 74/878 X |

FOREIGN PATENT DOCUMENTS

WO90/09904 9/1990 PCT Int'l Appl. .................. 192/4 A

Primary Examiner—Leslie A. Braun
Assistant Examiner—David E. Henn
Attorney, Agent, or Firm—Oliff & Berridge

[57] ABSTRACT

A shift lever locking device basically comprising a shift lock plate, a plate stopper, a solenoid, a release lever and a control switch, all of which are assembled on a base plate and shaped in the form of a unit together with the base plate.

15 Claims, 3 Drawing Sheets

SHIFT LEVER LOCKING DEVICE FOR AUTOMATIC TRANSMISSION

BACKGROUND OF THE INVENTION

1. Field of the Invention

The present invention relates to a shift lever locking device suitable for use with an automatic transmission, which is employed in a shift lever of the automatic transmission and restrains the shift lever from shifting so as to be locked at a specified shift position.

2. Description of the Related Art

A shift lever for an automatic transmission is constructed in such a manner that a detent pin attached to the shift lever is moved in the axial direction of the shift lever so as to be disconnected from a detent plate, thereby enabling the shift lever to be shifted to a desired shift position.

As a shift lever locking device capable of operating the shift lever only under specified conditions, e.g., only when a brake is pressed, there is known one in which a shift lock plate restrains a detent pin attached to a shift lever from shifting. In this type of shift lever locking device, when the shift lever is in a parking range (P range), the detent pin is brought into engagement with the shift lock plate and a plate stopper prevents the shift lock plate from movement, thereby preventing the shift lever from shifting. When, on the other hand, the brake is pressed, a solenoid is energized to move the plate stopper to a desired direction so as to enable the movement of the shift lock plate, thereby making it possible to shift the shift lever to a desired shift position.

Further, a shift lever locking device is also known in which only when the solenoid is electrically connected to an ignition-key inserting cylinder and the shift lever is at the parking range and when the ignition key is inserted into the ignition-key inserting cylinder and put in the ON position, the solenoid is energized to enable the movement of the detent pin, thereby making it possible to shift the shift lever to a desired shift position.

It is needless to say that the shift lever locking device for the automatic transmission is required to have high dimensional accuracy and assembly precision. However, this is not easily achieved since the shift lever locking device is comprised of a plurality of components. Therefore, measures for rectifying this situation have been demanded.

SUMMARY OF THE INVENTION

With the foregoing in view, it is an object of the present invention to provide a shift lever locking device suitable for use with an automatic transmission, which is capable of improving the efficiency of assembly and facilitating the control of assembly precision.

According to one aspect of the present invention, there is provided a shift lever locking device suitable for use with an automatic transmission, which is activated to restrict a shift lever from shifting so as to be locked at a specified shift position, comprising a shift lock plate disposed so as to be engageable with a detent pin mounted on the shift lever, the detent pin restricting the shift lever from shifting in response to an engagement with a detent plate, the shift lock plate being moved together with the detent pin when the shift lock plate has been brought into engagement with the detent pin, a plate stopper disposed so as to be engageable with the shift lock plate and activated to prevent the shift lock plate from being moved in a predetermined direction when the plate stopper has been brought into engagement with the shift lock plate, a solenoid coupled to the plate stopper so as to actuate the plate stopper usually to thereby prevent the shift lock plate from being moved in the predetermined direction, the solenoid being electrically energized so as to move the plate stopper to thereby release the shift lock plate from restraint of its movement in the predetermined direction, a control switch for detecting the position where the shift lock plate is moved, and a base plate disposed on the side of the detent plate and provided thereon with the shift lock plate, the plate stopper, the solenoid and the control switch which have been assembled into an integral unit.

According to the above construction of the present invention, the respective components of a lock mechanism, which are the shift lock plate, the plate stopper, the solenoid and the control switch, are assembled onto the base plate in the form of a single unit. Therefore, the efficiency of assembly of the components is improved and the control of assembly precision becomes easier. In addition, the components can be used in common and standardized. Furthermore, the components can be automatically assembled. Thus, the range of application to the shift lever can be increased.

The above and other objects, features and advantages of the present invention will become apparent from the following description and the appended claims, taken in conjunction with the accompanying drawings in which a preferred embodiment of the present invention is shown by way of illustrative example.

DETAILED DESCRIPTION OF THE PREFERRED EMBODIMENTS

Figure 3:
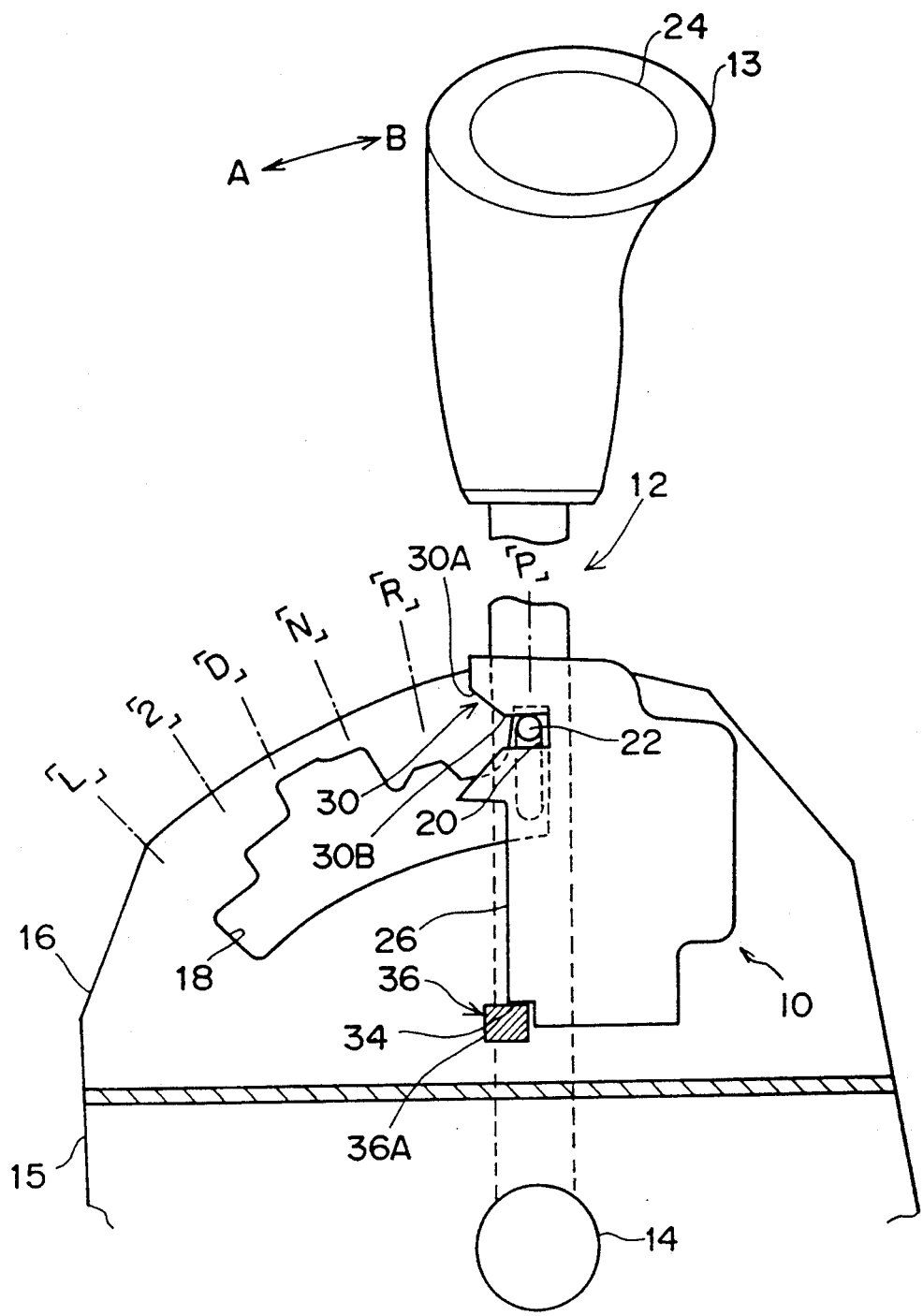
FIG. 3 is a partially cross-sectional view of a shift lever to which the shift lever locking device for the automatic transmission is applied.

FIG. 3 is a partially cross-sectional view showing a shift lever 12 to which a shift lever locking device 10 for an automatic transmission according to the present invention is applied.

A shift lever 12 is axially mounted to a base plate 15 through a cylindrical retainer 14. The shift lever 12 can be shifted in the directions indicated by the arrows A and B shown in FIG. 3 about the retainer 14 by operating a shift knob 13 mounted on the upper end of the shift lever 12.

A detent plate 16 is vertically disposed on the upper end of the base plate 15 in such a manner that the direction of thickness of the detent plate 16 extends in the axial direction of the retainer 14. The detent plate 16 has a detent hole 18 extending therethrough. A detent pin 22, which is attached to the shift lever 12 and extends in the direction substantially at a right angle to the axial direction of the shift lever 12 from an elongated hole 20 defined in the shift lever 12, extends through the detent hole 18.

The detent pin 22 is guided along the elongated hole 20 and can be moved upward and downward along the axial direction of the shift lever 12. In addition, the detent pin 22 is urged upward by an unillustrated urging means provided inside the shift lever 12. The detent pin 22 is coupled to a detent release button 24 attached to the shift knob 13 via an unillustrated rod or the like disposed inside the shift lever 12. When the detent release button 24 is pressed, the detent pin 22 can be moved downward (i.e., in the direction in which the detent pin 22 approaches the retainer 14) against an urging force produced by the urging means.

The detent hole 18 has an upper inner peripheral wall formed in a concavo-convex manner in connection with respective shift positions represented by "P", "R", "N", "D", "2" and "L". Thus, the movement of the detent pin 22 in the direction indicated by the arrow A or B is restricted.

That is, the respective shift positions are set in such a manner that the shift lever 12 can be swingingly moved in the direction indicated by the arrow A or B after the detent pin 22 has been moved downward by pressing the detent release button 24. When the shift lever 12 is at the shift position "P" for example, the detent pin 22 is fitted in a deep groove defined in the detent hole 18. When the detent release button 24 is not pressed, the shift lever 12 cannot be shifted to the shift position of "R".

The shift lever locking device 10 is disposed on the side of the detent plate 16, i.e., in a position where the leading end of the detent pin 22 projects from the detent hole 18.

Figure 1:
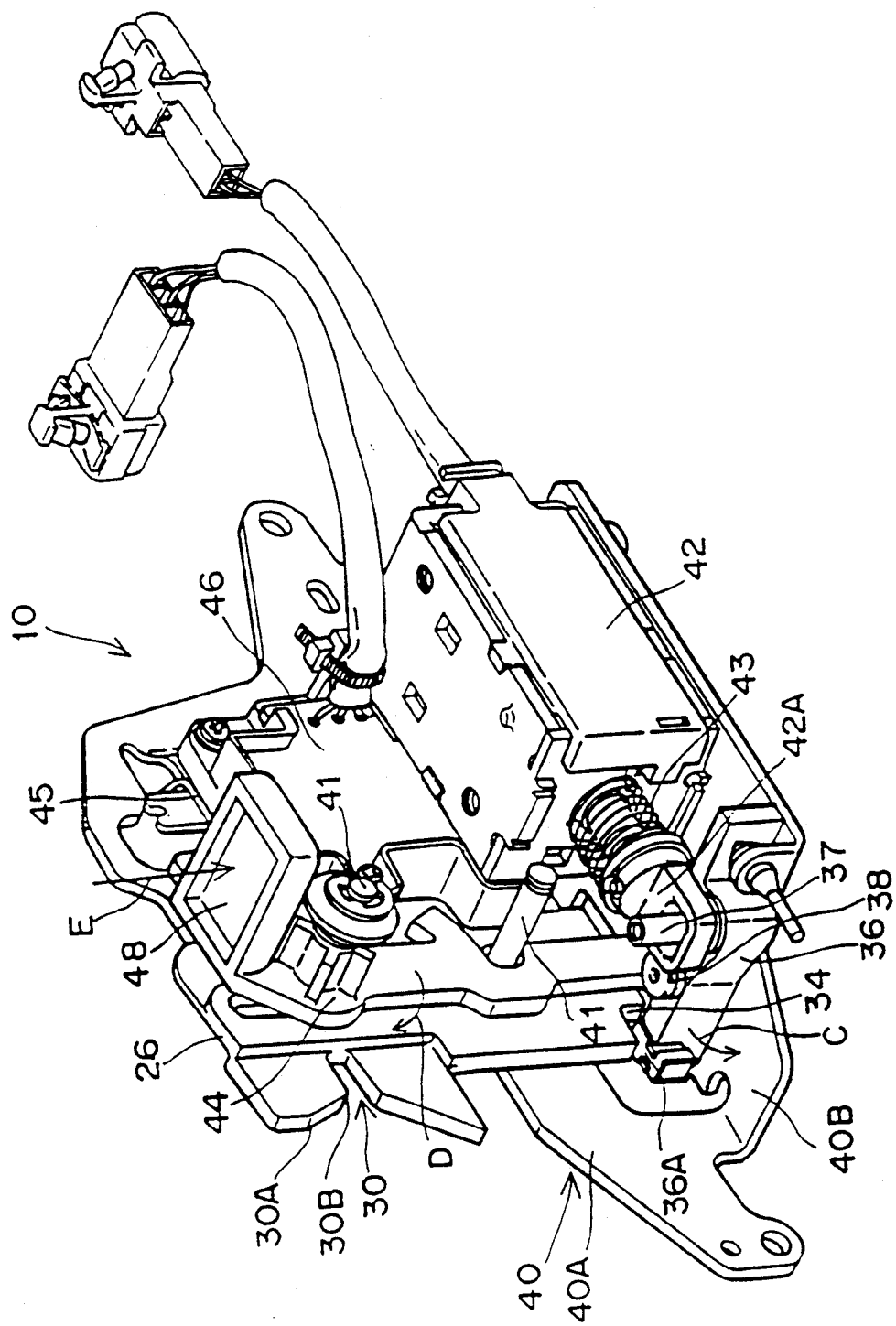
FIG. 1 is a perspective view of a shift lever locking device for an automatic transmission according to the present invention.
Figure 2:
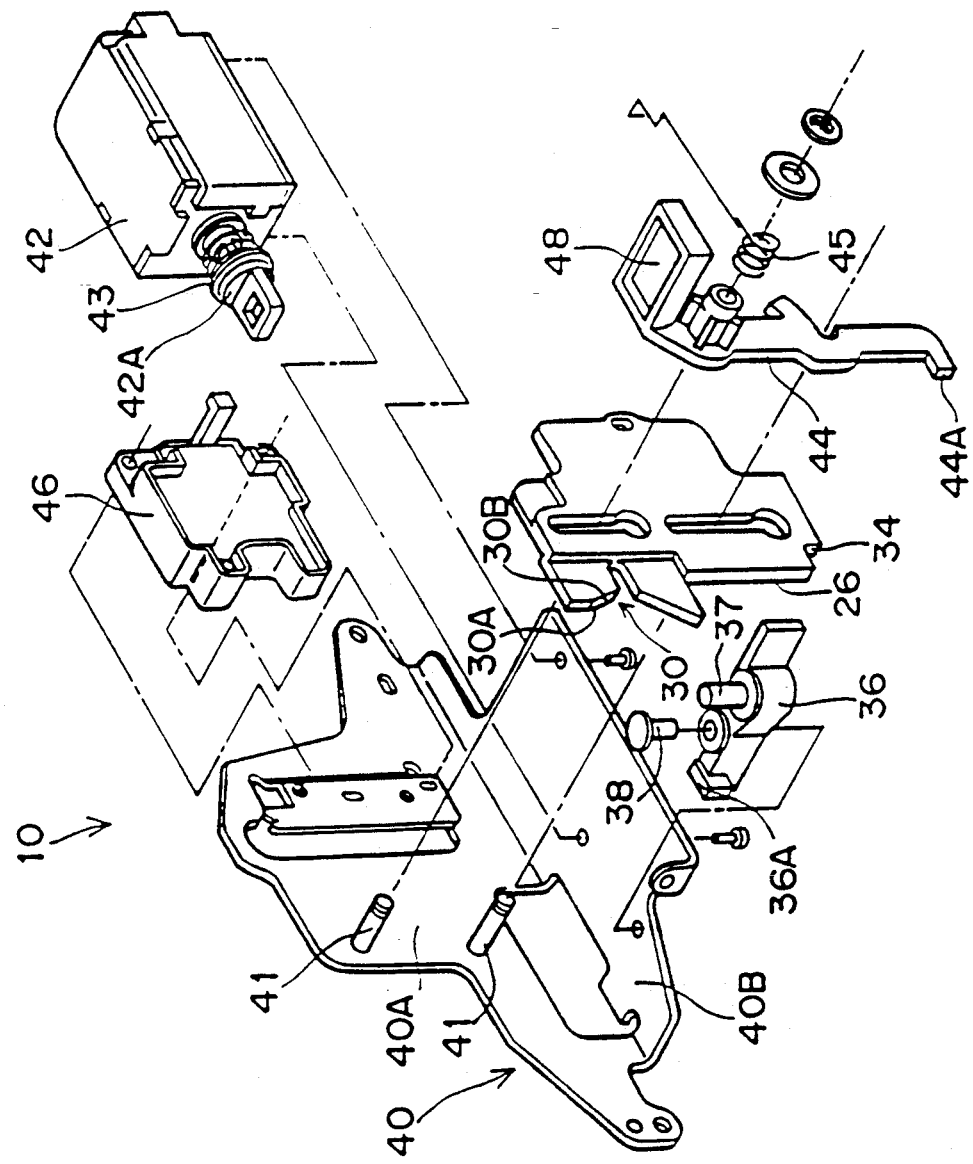
FIG. 2 is an exploded perspective view of an assembly of components which constitute the shift lever locking device for the automatic transmission according to the present invention.

As shown in detail in FIGS. 1 and 2, the shift lever locking device 10 has a base plate 40. The base plate 40 is formed as a plate-shaped member having an L-bent cross section and fixed to the side of the detent plate 16. A pair of support pins 41 projects in parallel from a side wall 40A of the base plate 40. A lock plate 26 is slidably supported by the support pins 41. When the shift lever 12 is at the "P" shift position, the lock plate 26 can be moved upward and downward along the axial direction of the shift lever 12. A cut-away portion 30, which is opened toward the "R" shift position as seen on the left side in FIG. 3, is defined in the upper end of the lock plate 26. In addition, the cut-away portion 30 has a tapered inlet or entrance 30A which is opened. When the shift lever 12 is shifted from the "R" shift position to the "P" shift position, the detent pin 22 is moved into a portion 30B of the cut-away portion 30, which is formed deeply away from the entrance 30A. When the lock plate 26 is brought to the bottom position, the entrace 30A of the cut-away portion 30 overlaps with the detent hole 18 to thereby enable the detent pin 22 to be moved toward the "R" shift position.

The lock plate 26 has a lower cut-away portion 34 defined in a corner of one of the lower ends thereof. An engagement portion 36A serving as the leading end of a plate stopper 36 can approach and engage the lower cut-away portion 34. The plate stopper 36 is rotatably supported by a support pin 38 whose axis extends in a vertical direction and which is fixed to a bottom wall 40B of a base plate 40. When the engagement portion 36A of the plate stopper 36 is brought into engagement with the lower cut-away portion 34, the lock plate 26 cannot be moved downward. Therefore, the detent pin 22 cannot be moved from the deep groove defined in the detent hole 18 at the "P" shift position, so that the shifting operation of the shift lever 12 is stopped, i.e., the shift lever 12 is brought into a shift locked state.

In FIG. 1, one sees a solenoid 42 mounted on the bottom wall 40B of the base plate 40. A plunger 42A is coupled to a projection 37 formed on the plate stopper 36. When the solenoid 42 is energized, it attracts the plunger 42A. When, on the other hand, the solenoid 42 is de-energized, the plunger 42A is released from attraction and an urging force of a return spring 43 wound around the plunger 42A urges the plunger 42A in a direction away from the solenoid 42. When the solenoid 42 is energized, it attracts the plunger 42A against the urging force of the return spring 43, thereby swinging the plate stopper 36 about the support pin 38 in the direction indicated by the arrow C in FIG. 1. When the plate stopper 36 is swung in the direction indicated by the arrow C in FIG. 1, the engagement portion 36A is moved away from the lower cut-away portion 34 of the lock plate 26.

The solenoid 42 is energized under electrical control only when the shift lever 12 is selected in the "P" shift position, an ignition switch (not shown) is "ON" and a foot brake is depressed when an engine is in operation. That is, the solenoid 42 is not energized when the shift lever 12 is put in a shift position other than the "P" shift position, the ignition switch is "ON" and the engine is not in operation.

A control switch 46 is mounted between the side wall 40A of the base plate 40 and the solenoid 42. The control switch 46 enables an unillustrated contact plate to slide together with the lock plate 26 and can detect the shifting position of the lock plate 26.

A release lever 44 is rotatably supported on the side face of the lock plate 26 by the upper support pin 41. The release lever 44 has a projection 44A which is formed at the lower part thereof and can abut the side face of the plate stopper 36 (see FIG. 2). A torsion coil spring 45 is wound around the upper support pin 41. One of the ends of the torsion coil spring 45 engages the corresponding side wall 40A of the base plate 40, whereas the other end of the torsion coil spring 45 with the release lever 44. When the release lever 44 is rotated in the direction indicated by the arrow D in FIG. 1, a desired urging force acts on the release lever 44 so as to return it to the original position.

The release lever 44 has a dish-shaped pressing portion 48 which is formed on the upper end thereof so as to project in the direction substantially at a right angle to the longitudinal direction of the release lever 44. An unillustrated manually-operated release button is brought into abutment with the pressing portion 48. When the pressing portion 48 is pressed in the direction indicated by the arrow E in FIG. 1, the release lever 44 is rotated in the direction indicated by the arrow D about the support pins 41.

As described above, the lock plate 26, the plate stopper 36, the solenoid 42, the control switch 46 and the release lever 44 and the like are assembled from one side of the single base plate 40. They are shaped in the form of a unit together with the base plate 40.

The operation of the present embodiment will now be described below.

When the ignition switch is at the "ACC" or "LOCK" positions, the solenoid 42 is brought into a de-energized state. Therefore, the plate stopper 36 is urged in the direction opposite to the direction indicated by the arrow C by the return spring 43 so as to cause the engagement portion 36A to enter the lower cut-away portion 34 of the lock plate 26. Thus, the lock plate 26 is prevented from being moved downward along the axis of the shift lever 12. Accordingly, the detent pin 22 is prevented from movement to a state in which the detent pin 22 has been moved into the deep groove of the detent hole 18, thereby making it possible to prevent the shift lever 12 from shifting.

When it is desired to shift the shift lever 12 to a desired shift position, the foot brake is pressed after the engine has been started by effecting "ON" and "START" operations of the ignition switch. As a result, the solenoid 42 is energized under the electrical control so as to attract the plunger 42A against the urging force of the return spring 43, thereby swinging the plate stopper 36 in the direction indicated by the arrow C in FIG. 1 about the support pin 38. Therefore, the engagement portion 36A of the plate stopper 36 is moved away from the lower cut-away portion 34 of the lock plate 26. Thus, the lock plate 26 can be moved downward, so that the detent pin 22 can be moved downward by pressing the detent release button 24, thereby making it possible to shift the shift lever 12 to a desired shift position.

When the engine is not in operation or disconnected from a power supply upon maintenance of a vehicle, for example, the solenoid 42 is not energized. Therefore, the plate stopper 36 is urged in the direction opposite to the direction indicated by the arrow C in FIG. 1 by the urging of the return spring 43 so as to allow the engagement portion 36A to engage the lower cut-away portion 34 of the lock plate 26. Therefore, the lock plate 26 cannot be moved downward along the axis of the shift lever 12, so that the shift lever 12 is prevented from being moved downward from the detent pin 22, thereby bringing the shift lever 12 into a non-shiftable state, i.e., a shift locked state.

When a operator shifts the shift lever 12 to a desired shift position in this condition, the operator manually operates the shift lever 12 so as to forcibly release it from the shift locked state, thereby enabling the shift lever 12 to be shifted to the desired shift position.

That is, when the pressing portion 48 of the release lever 44 is pressed in the direction indicated by the arrow E in FIG. 1, the release lever 44 is rotated in the direction indicated by the arrow D in FIG. 1. Therefore, the projection 44A of the release lever 44 abuts the side face of the plate stopper 36 and presses it, thereby rotating the plate stopper 36 about the support pin 38 against the urging forces of the return spring 43 and the torsion coil spring 45. As a result, the engagement portion 36A of the plate stopper 36 is moved away from the lower cut-away portion 34 of the lock plate 26 so as to release the shift lever 12 from locking. Accordingly, the shift lever 12 can be shifted to a desired shift position by pressing the detent release button 24.

In the shift lever locking device 10 constructed as described above, the components of a lock mechanism, which comprise the lock plate 26, the plate stopper 36, the solenoid 42, the release lever 44 and the control switch 46, are assembled integrally with the single base plate 40 in the form of a unit. Thus, when the shift lever locking device 10 is applied to the shift lever 12, the efficiency of assembly of the components is improved and the control of assembly precision is easier. The components can also be automatically assembled. In addition, the components can be used in common and standardized. Therefore, the shift lever locking device 10 can have a wide range of application to the shift lever 12.

In the shift lever locking device 10 as well, the respective components are assembled from one side of the base plate 40. Therefore, the entire assembly efficiency is improved when the shift lever locking device 10 is applied to the shift lever 12. In addition to such an improvement, the efficiency of assembly of the individual components at the time the respective components are combined into a unit can also be improved and the assembly of the individual components can be easily automated. It is therefore possible to reduce manufacturing costs.

The present invention which has been constructed as described above, can bring about excellent advantageous effects in that the assembly efficiency is improved, the control of precision for the assembly of the components is easier and the components can be used in common and standardized or the assembly of the components can be automatically carried out.

Having now fully described the invention, it will be apparent to those skilled in the art that many changes and modifications can be made without departing from the spirit or scope of the invention as set forth herein.

What is claimed is:

1. A shift lever locking device for use with an automatic transmission comprising:
   a shift lever having a detent pin mounted thereon;
   a detent plate;
   a single base plate mounted on one side of the detent plate;
   a shift lock plate mounted on the single base plate and engageable with said detent pin mounted on said shift lever to restrict said shift lever from shifting in response to engagement with said detent plate, said shift lock plate moving together with said detent pin when said shift lock plate engages with said detent pin;
   a plate stopper mounted on the single base plate and engageable with said shift lock plate to prevent said shift lock plate from being moved in a predetermined direction when said plate stopper has been brought into engagement with said shift lock plate;
   a solenoid mounted on the single base plate and coupled to said plate stopper so as to actuate said plate stopper to thereby prevent said shift lock plate from being moved in the predetermined direction;
   energizing means for selectively energizing said solenoid so as to selectively move said plate stopper to thereby release said shift lock plate to allow said shift lock plate to move in the predetermined direction; and
   a control switch mounted on the single base plate for detecting the position where said shift lock plate is moved;
   wherein said shift lock plate, said plate stopper, said solenoid and said control switch are structurally, integrally assembled on said single base plate to form an integral unit prior to disposition of said integral unit on said detent plate.

2. A shift lever locking device according to claim 1, wherein said base plate is a substantially L-shaped plate member having a side surface and a bottom surface formed so that the side surface of said base plate abuts against and is fixed to one side surface of said detent plate.

3. A shift lever locking device according to claim 2, wherein said base plate has a pair of support members on the side surface thereof, for supporting said shift lock plate.

4. A shift lever locking device according to claim 3, wherein said pair of support members are pin-shaped members.

5. A shift lever locking device according to claim 3, wherein said shift lock plate has a pair of elongated slots which have been cut away along the vertical direction of a vehicle so as to be formed in an opposing relationship to said pair of support members, said pair of support members being moveable into said shift lock plate in such a manner that said shift lock plate can be moved in the same direction as that in which said detent pin extends.

6. A shift lever locking device according to claim 5, wherein said plate stopper has a pin-shaped member vertically disposed on the bottom surface of said base plate for rotatably supporting a substantially intermediate portion of said plate stopper, said plate stopper having one end fixed to said pin-shaped member so as to be rotatable about said pin-shaped member to prevent said shift lock plate from being moved in the predetermined direction and to prevent release of said shift lock plate from a movement preventing condition.

7. A shift lever locking device according to claim 6, wherein said plate stopper has a projection disposed in the vicinity of the other end of said plate stopper, wherein said projection is coupled to said solenoid.

8. A shift lever locking device according to claim 7, wherein said solenoid is fixed to the bottom surface of said base plate and has a plunger.

9. A shift lever locking device according to claim 8, wherein said plunger has a compression spring means wound thereon for urging said plate stopper via said plunger in such a manner that said shift lock plate is prevented from being moved.

10. A shift lever locking device according to claim 6, further comprising:
a release lever rotatably mounted on the base plate and capable of pressing a portion of said plate stopper in the vicinity of said one end thereof in such a manner that said shift lock plate is released from restraint of its movement, wherein when said release lever rotates, said release lever presses against said portion of said plate stopper.

11. A shift lever locking device according to claim 10, wherein said release lever has a torsion coil spring which urges said release lever in the direction in which said release lever is spaced away from said plate stopper.

12. A shift lever locking device according to claim 11, wherein said release lever has a pressing portion at one end thereof, said pressing portion being pressed against an urging force of said torsion coil spring so as to press said portion of said plate stopper.

13. The shift lever locking device of claim 1 wherein said single base plate comprises a substantially L-shaped member having a side wall and a bottom wall, said side wall and said bottom wall being connected so as to form an L-shaped, partially enclosed area, wherein said shift lock plate, said plate stopper, said solenoid and said control switch are structurally, integrally assembled on said single base plate substantially within said L-shaped, partially enclosed area.

14. A method of assembling a shift lever locking device comprising a shift lever having a detent pin mounted thereon; a detent plate; a single base plate mounted on one side of the detent plate; a shift lock plate mounted on the base plate and engageable with said detent pin mounted on said shift lever to restrict said shift lever from shifting in response to engagement with said detent plate, said shift lock plate moving together with said detent pin when said shift lock plate engages with said detent pin; a plate stopper mounted on the base plate and engageable with said shift lock plate to prevent said shift lock plate from being moved in a predetermined direction when said plate stopper has been brought into engagement with said shift lock plate; a solenoid mounted on the base plate and coupled to said plate stopper so as to actuate said plate stopper to thereby prevent said shift lock plate from being moved in the predetermined direction; energizing means for selectively energizing said solenoid so as to selectively move said plate stopper to thereby release said shift lock plate to allow said shift lock plate to move in the predetermined direction; a control switch mounted on the base plate for detecting the position where said shift lock plate is moved; the assembling method comprising the steps of:
integrally assembling the shift lock plate, plate stopper, solenoid and control switch on the single base plate to form an integral unit such that said shift lock plate, said plate stopper, said solenoid and said control switch are operably connected to each other prior to mounting of said integral unit on the detent plate; and
operably mounting said integral unit on said detent plate.

15. A method of assembling a shift lever locking device according to claim 14, further comprising the step of rotatably mounting a release lever on said single base plate.

* * * * *